US005737581A

United States Patent [19]

Keane

[11] Patent Number: 5,737,581

[45] Date of Patent: Apr. 7, 1998

[54] QUALITY SYSTEM IMPLEMENTATION SIMULATOR

[76] Inventor: John A. Keane, 273 Jefferson Rd., Princeton, N.J. 08540

[21] Appl. No.: 520,870

[22] Filed: Aug. 30, 1995

[51] Int. Cl.[6] ................................ G06F 9/44; G06F 9/445

[52] U.S. Cl. ................................ 395/500; 395/10; 395/50; 395/60; 395/210; 364/551.01; 364/552; 364/226.7; 364/274.2; 364/DIG. 1; 364/468.01; 364/468.1; 364/468.16

[58] Field of Search ................................ 395/500, 11, 22, 395/76, 60, 10, 210, 207, 208, 209; 364/578, 165, 164, 149, 551.01, 468, 550, 167, 552, 274.2, 274.3, 226.7, DIG. 1, 468.01, 468.1, 468.16

[56] References Cited

U.S. PATENT DOCUMENTS

| | | | |
|---|---|---|---|
| 5,202,837 | 4/1993 | Coe et al. | 364/476 |
| 5,210,704 | 5/1993 | Husseiny | 364/551.01 |
| 5,410,634 | 4/1995 | Li | 395/10 |
| 5,412,758 | 5/1995 | Srikanth et al. | 395/75 |
| 5,432,887 | 7/1995 | Khaw | 395/11 |
| 5,539,652 | 7/1996 | Tegethoff | 364/490 |

OTHER PUBLICATIONS

QMS Programs: Computer Software, QCOS User's Reference Manual, Version 3.0, Feb. 1992, Table of Contents and Chapter 13: The GENDAT Module.

Kareh et al., "Yield Management in Microelectronic Manufacturing", IEEE, 1995, pp. 58–63.

*Primary Examiner*—Kevin J. Teska
*Assistant Examiner*—Thai Phan
*Attorney, Agent, or Firm*—Synnestvedt & Lechner

[57] ABSTRACT

A process is disclosed for simulating on a computer system the implementation of a quality system on a business having a product flow. The process entails first inputting a selection of quality assurance measures of the quality system, and then configuring a quality model resident within the computer system according to the selection. This forms a configured quality model which has a mathematical relationship representing each quality assurance measure selected. Next, product flow data is generated representing the product flow having a number of defects. In the preferred embodiment, the selection of quality assurance measures affects the number of defects being introduced into the product flow. The product flow data may be generated within the computer system or by a source outside the system. The configured quality model is then applied to the product flow data, and the results of the quality assurance measures on the product flow are displayed on a user interface of the computer system. The basic simulator may be augmented with other models such as accounting, consumer, financial and macroeconomic models to enhance realism. Other embodiments of the invention include both a computer program and a system for performing the aforementioned process.

30 Claims, 10 Drawing Sheets

QUALITY SYSTEM IMPLEMENTATION SIMULATOR

REFERENCE TO MICROFICHE APPENDIX

A source code listing of a working embodiment of the present invention is provided in a Microfiche Appendix. The Microfiche Appendix consists of three (3) sheets of microfiche containing 167 frames. Copyright 1995 by John A. Keane, All Rights Reserved.

BACKGROUND OF THE INVENTION

The invention relates generally to a computer based simulator, and more specifically to a simulator that emulates the implementation of a quality system on a business. A quality system provides the means to monitor and measure quality. As businesses become more interconnected and international, the need for a quality system grows. For example, an automobile company does not manufacture every component of a car, but rather relies on suppliers for subassemblies such as the headlights and radios. The automobile company nevertheless remains responsible for these subassemblies, and its reputation may suffer if the parts fail. It therefore behooves the company to control the quality of its vendors. A quality system provides that control.

By accounting for quality, those familiar with the quality system can perform quality audits on a business to ensure that a requisite quality level is maintained. In this way, its function is analogous to an accounting system, such as GAAP (Generally Accepted Accounting Principles), which accounts for finances but does not necessarily improve profits. Traditionally, businesses have implemented their own quality system or had a system mandated by an important client. This results in a variety of systems, and consequently, auditors must learn multiple systems and attempt to compare "apples to oranges." To be sure, this contravenes a major objective of a quality system to standardize quality assessment. The problem intensifies when doing business in foreign countries in foreign languages. For this reason, a quality system standard, ISO 9000, has been adopted by most of the industrialized nations. The ISO 9000 quality system consists of the following twenty subsystems:

| | |
|---|---|
| Management Responsibility | Inspection/Test Equipment |
| Quality System Manual | Inspection/Test Status |
| Contract Review | Control of Nonconforming Product |
| Design Control | Corrective Action |
| Document Control | Handling, Storage, Packing |
| Purchasing | Quality Records |
| Purchaser Supplied Product | Internal Quality Audits |
| Product Identification & Traceability | Training Servicing |
| Process Control | Statistical Techniques |
| Inspection & Testing | |

Once a business adopts a system, a manager must decide on which subsystems to implement. This can be a difficult decision since each subsystem entails installation and operation costs. Moreover, some of the subsystems function to recommend corrective actions, the implementation of which further increases the cost of quality. Thus, the manager is presented with the task of not only learning the quality system, but also deciding which subsystems to implement. Such a task can difficult, time consuming, and financially risky. A need therefore exists for a simulator that will enable a manager to practice and experiment with a quality system without the attendant risks. The present invention fulfills this need.

SUMMARY OF THE PRESENT INVENTION

The present invention is directed at providing a user with means to learn and experiment with a quality system such as ISO 9000. In one embodiment, the invention is a process for simulating on a computer system the implementation of a quality system on a business having a product flow. The process entails first inputting a selection of quality assurance measures of the quality system, and then configuring a quality model resident within the computer system according to the selection. This forms a configured quality model which has a mathematical relationship representing each quality assurance measure selected. Next, product flow data is generated representing the product flow having a number of defects. In the preferred embodiment, the selection of quality assurance measures affects the number of defects being introduced into the product flow. The product flow data may be generated within the computer system or by an outside source. The configured quality model is then applied to the product flow data, and the results of the quality assurance measures on the product flow are displayed on a user interface of the computer system. The basic simulator may be augmented with other models such as accounting, consumer, financial and macroeconomic models to enhance realism. Other embodiments of the invention include both a computer program and a system for performing the aforementioned process.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

DETAILED DESCRIPTION OF THE PRESENT INVENTION

System Overview

The objective of the Simulator is to enable a user to make certain decisions regarding which quality assurance measures to install, and to see the impact of these decisions on business performance (e.g. sales and profits). The simulator may be used as an instructional tool for illustrating the effects of a quality system, or it may be used as a planing guide to examine alternative quality assurance measures. Since it is only a simulation, the user can learn or plan a quality system absent financial risk.

Figure 1:
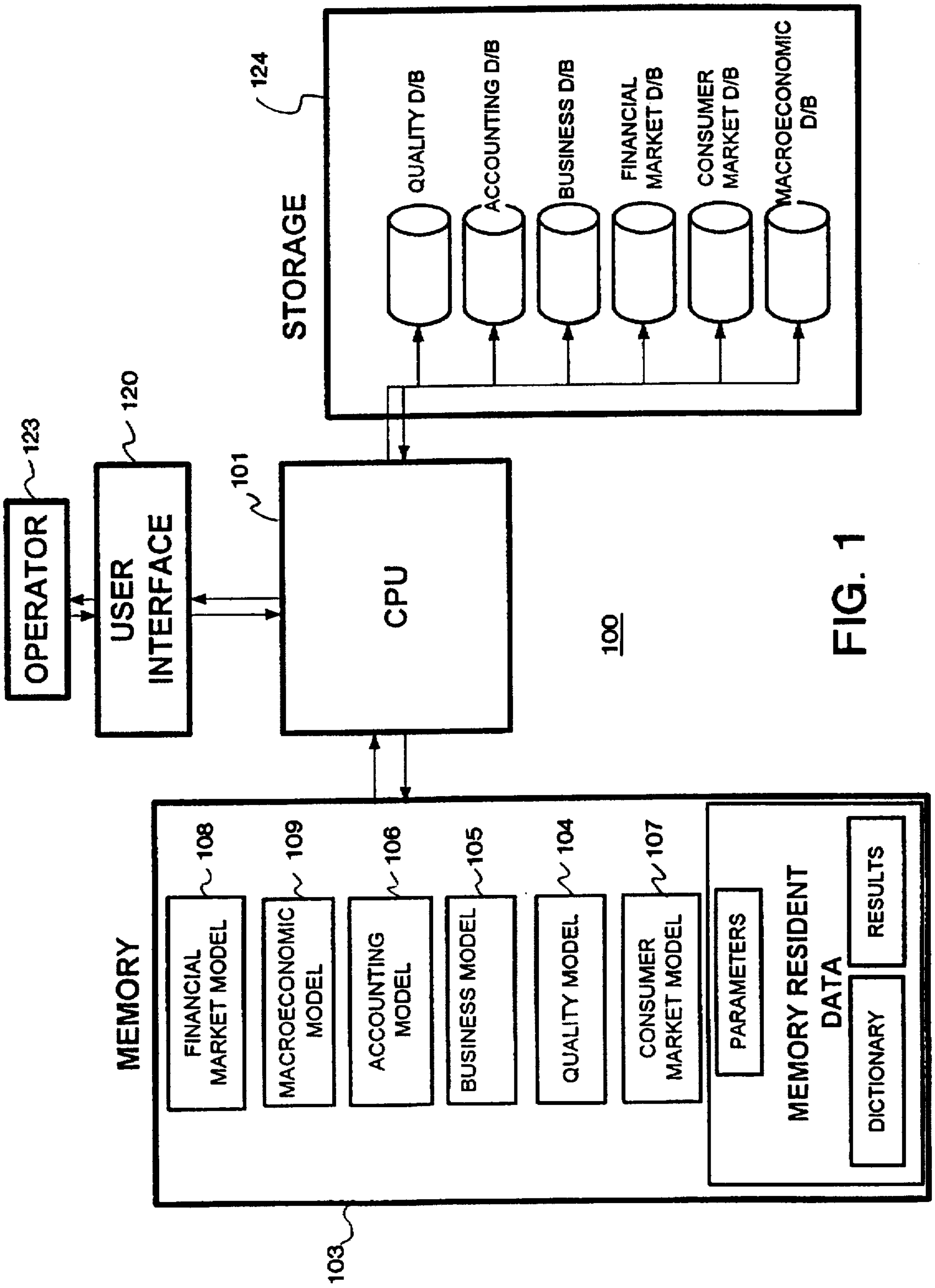
FIG. 1 shows a system diagram of the present invention.

With reference to FIG. 1, there is shown a high level system diagram of components comprising the computer based quality simulator system 10. System 10 simulates the implementation of a quality system on a business having a product flow. The business in this simulator entails profit or non-profit organizations involved in manufacturing, agricultural, or service industries. The product flow includes materials, compounds, intermediates, parts, subassemblies, assembles, and other items of a discrete or process nature, as well as paper work flow or intellectual work product. The quality system includes any system to assure quality within the business such as inspections, process control, training, and preventative maintenance. There are a number of such systems in existence. In this disclosure, the nomenclature and subset structure of ISO 9000 is used since it is the international standard. It should be understood, however, that ISO 9000 is not the only quality system on which the quality model may be based. ISO 9000 is composed of requirements divided into twenty subsystems as listed above in the Background section. Throughout this disclosure, the subsystems are referred to as quality assurance measures. These measures serve to monitor, prevent, and correct defects in the product flow.

The system 100 includes a central processor unit (CPU) 101, memory 102, and a user interface 103. The user interface may comprise traditional equipment such as a monitor and printer for displaying information for the user and a keyboard and mouse for entering information, as well as more exotic equipment such as scanners, voice recognition systems, and touch screens. It is anticipated that system 100 may be configured to accommodate any user interface both known and in the future. The memory 102 contains at least a quality model 104 and possibly other models, such as business 105, accounting 106, consumer 107, financial 108, and macroeconomic 109. These models have mathematical algorithms to simulate the implementation of a quality system on a business. The memory 102 also stores the resident parameters and data to enable the CPU 101 to process the mathematical algorithms. Once the CPU processes the information, the memory 102 stores the results. The system 100 may also include a data storage 124 for storing information associated with the aforementioned models.

Figure 2:
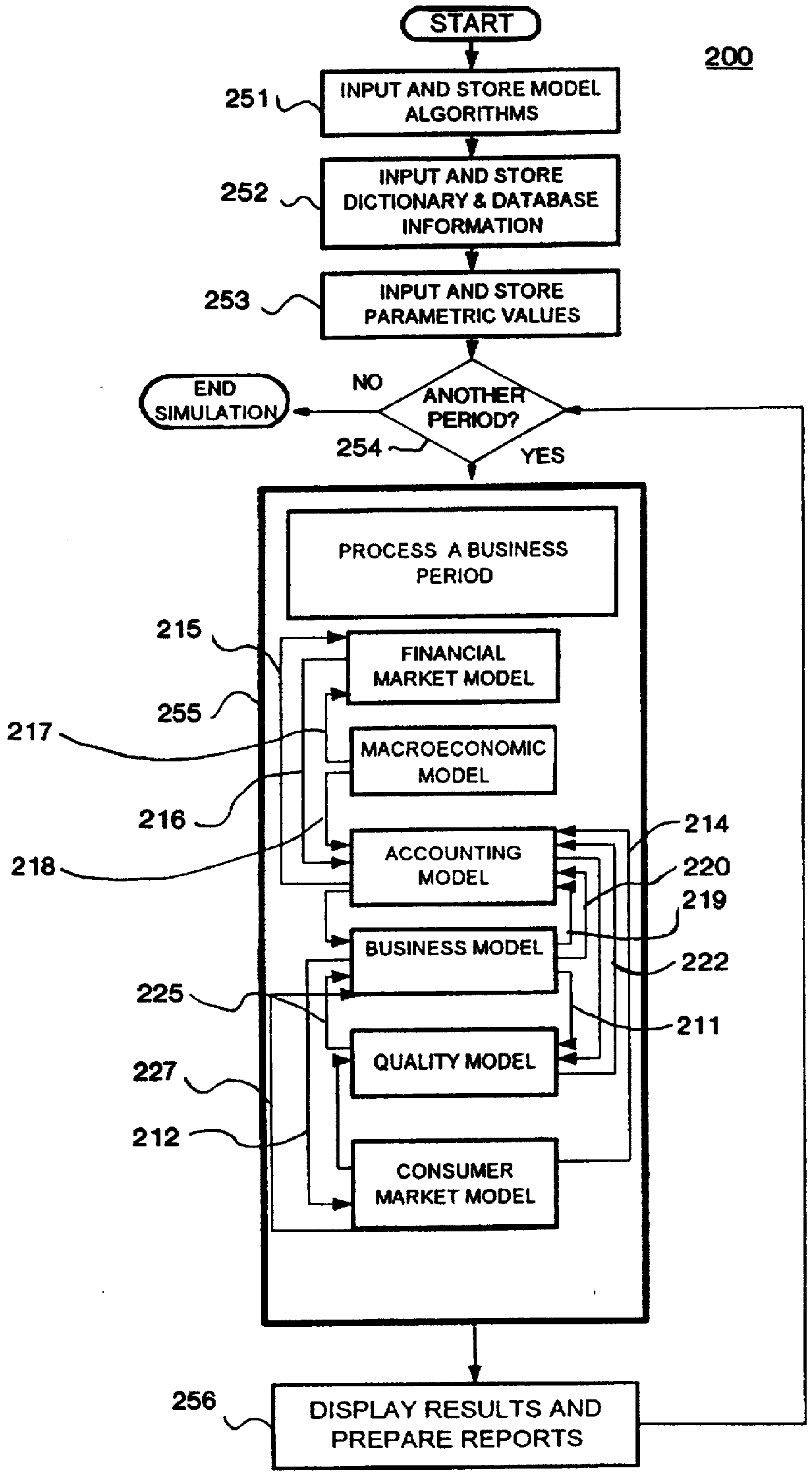
FIG. 2 shows an overall flow chart of the invention's operation.

The overall process of the system is shown in FIG. 2, and a working computer program is attached as Microfiche Appendix. When a user starts the system 100, the various models are inputted and stored in memory 102 according to Block 51 such that the models are resident within the system 100. Alternatively, certain models may be stored on disk or in other information storage means if the memory 102 cannot accommodate all the models simultaneously. In this configuration, the CPU 101 would transfer models from the disk to the memory if needed, and return models back to the disk when dormant. Such a function is well known in the art.

Next, data such as the nature of the company, the characteristic defects and causes, and past performance is made resident in memory 102 by Block 52. This data customizes a particular business to provide realistic product flow and defects, rather than operating as a preset, arbitrary model. In one particular embodiment, a user may customize "defects" to his particular business to more realistically emulate the characteristic and cause of a defect. To this end, information relating to the cause, effect, and solution of the defects may be inputted into a User Defined Table of Defect Events (UDTDE) data base. Such data may be entered by the user contemporaneously with the program's operation, or it may be entered into data storage 124 prior to the program's operation and accessed as needed by the CPU 101. The data storage 124 may be any data storage means such as a disk, hard drive, or memory. If other than memory, the exchange of data between the memory 102 and data storage 124 would be controlled by CPU 101 using known methods.

The system 100 is finally initialized when various model parameters are inputted and stored in memory 102 in Block 53. Parameters allow the system to be "tuned" for a simulation. Each model has its own parameters, examples of which are as follows:

Quality model includes capital, material, and labor requirements of the quality assurance measures, the effectiveness of corrective actions Business model includes the product type, capital, material, and labor requirements of the product itself as well as physical requirements of the plant, warehouse, etc.

Accounting model has costs assigned to the capital, material, and labor requirements listed above, and well as pricing information for the product purchased Consumer model includes effectiveness of advertising, likelihood of switching, and likelihood of returns Financial model includes initial stock price and book value It should be understood that this list is not exhaustive of the parameters used. Moreover, the distinction between data and parameters aids the user's conceptualization of the simulator, and should not be used to limit the scope of the invention. For example, the labor rate is considered a parameter and subject to change while the type of business and characteristic defects are constant relative to a particular business. One skilled in the art, however, would recognize that the data and parameters could be grouped together if desired. Moreover, one skilled in the art will recognize that the functions of Blocks 251, 252 and 253 can be performed in any sequence. By initializing the simulator according to a particular set of data and parameters, it becomes customized for a particular business situation, enabling the computer system 100 to generate realistic and useful feedback.

Following the initialization of the model by Blocks 251, 252 and 253, Block 254 determines if another period should be run. If not, the process ends. If another period should be run, then the various models are run for one period in Block 255, and the results of the simulation are displayed in Block 256. The process within Blocks 255 and 256 represents a major aspect of the present invention and will be described hereafter in greater detail.

First, the quality system 204 must be configured by a user. The user of the system 100 inputs a selection of quality assurance measures for controlling defects in the product flow. Each quality assurance measure corresponds to a mathematical relationship within the quality model. When the user selects a certain quality assurance measure, its corresponding mathematical relationship is enabled. Hence, the configured quality model comprises a selection of enabled mathematical relationships.

Product flow data is either generated within the computer system in the business model 105, or generated from an independent business model. The product flow data represents the product flow with a number of defects. In the embodiment of FIG. 1, the business model 105 is resident within the computer system 100, and generates the business flow data 211. The business model 105 has a mathematical relationship representing the product flow, and has a defect generator for introducing a number of defects into the product flow. In one preferred embodiment, the defect generator is responsive to the selection of quality assurance measures.

Next, the configured quality model 104 is applied to the product flow data 211. In the preferred embodiment, inspection and disposition data 225 affecting the product flow is outputted to the business model 105. At the end of a predetermined period (e.g., a day, week, or month), the user receives the results of the quality assurance measures on the product flow as determined by applying the configured quality model 104. This information may be displayed on the user interface 102 as either a display or a print-out.

The basic computer system 100 may be augmented with other models to more realistically emulate a business operation. Like the quality and business models, these models would be resident in the memory 103 of the computer system 100. To monitor and control finances within the business, the accounting model 106 may be employed. The accounting model 106 monitors revenue from the product sold as well as the costs associated with production. These costs include the capital, labor and material requirements of the product flow and the implemented quality system. Like the quality model 104, the accounting model 106 is based on an accounting system, which in this particular embodiment is GAAP. It should be understood, however, that other accounting systems may be used. The quality and business models 104, 105 in this embodiment generate first and second requirements 219, 222 of capital, labor and material used. The accounting model is then applied to the product flow data 220 and to the first and second requirements 219, 222. Contained within the accounting model 106 is a mathematical relationship representing income from the product flow and costs of the first and second requirements. After applying the accounting model 106, the accounting information generated is displayed for the user.

Supplementing the system with the consumer model 107 further adds realism to the simulation. The consumer model 107 emulates the goods/services purchased by customers. The decision to purchase from a particular business depends on a number of factors. For example, the number of consumers who purchase products from the business begins at an initial level and increases as a result of advertising and decreases as a result of dissatisfaction with defective products during a given period. Although many of the factors that influence a purchase decision remain unknown, the consumer model does attempt to simulate through a mathematical model the tendency of people to return defective merchandise and to switch to competitive products due to defects. It is anticipated that other consumer tendencies may be implemented in this model in the future. By applying the consumer model to the product flow data 212, product purchased data 214 and market demand and returns data 227 are generated. The product purchased data 214 represents the product purchased by consumers and may be used by the accounting model to calculate income based on actual products purchased rather than on products manufactured. The market demand and returns data 227 represents the demand for and returns of the product after consumers experience the defects. The business and quality models may be applied to the market demand and returns data 214 to adjust the product flow accordingly and to handle the returns. The market demand and product purchased data may be displayed at this point for information purposes.

The financial market represents capitalists interested in extending credit to the business in return for potential future gain. This market sets the price of the stock and the interest rate at which a business can borrow money based upon the businesses financial strength and exogenous macroeconomic factors. A financial model 108 considers the financial market of the business such as stocks, bonds, notes and lines of credit. In this particular embodiment, the stock price of the business is modeled; it should be understood though, that other market factors may be simulated as well. The value of the stock depends on a number of factors, not all of which are presently known. The financial model does simulate, however, the relationship of sales, profits and book value of the business to stock price through a mathematical representation. The financial model generates financial data 216 from the profit information 215 outputted from the accounting model 106. The accounting model uses the valuation set by the financial market to issue stock and borrow money. It is anticipated other factors will be considered in the future; for example, macroeconomic factors 217 from the macroeconomic model may be inputted into the financial model. After the financial model is applied, the financial information generated may be displayed for the user.

Aspects of the general economic climate that affect businesses may be represented in a macroeconomic model. Such aspects may include seasonal effect on a particular business, the price of energy, the stock market, world politics and other innumerable factors. Although no explicit macroeconomic model has been included in present embodiment, such models are known to exist and may be interfaced with the present invention.

Modeling of real life behavior of individuals within the simulation of Block 255 is managed in two ways. Certain tasks and decisions are automatically executed by the simulator (e.g., generation of defects), while other tasks and decisions are presented to the user for execution (e.g., investment decisions in quality assurance measures). It is anticipated, however, that the user may have even a greater role. That is, certain tasks performed by individuals (e.g., an inspector observing a test result) are simulated by creating an event (e.g. lot inspection) and assigning an equivalent labor impact (e.g. 1.7 minutes of an inspector's time) or a computer resource impact (e.g. 3.5 millisecond of a computer's CPU time.) to the event. Such tasks could be handled alternatively by requiring some analogue participation of the user to enhance realism. For example, the user may be asked to diagnosis the cause of a defect based upon a probability distribution of causes, rather than having the computer select the cause based on a Monte Carlo selection technique (discussed below).

Once the information generated in a period is displayed in Block 256, the program returns to Block 254 where the user is queried whether to continue. If the user responds affirmatively, the simulation continues where it ended in the previous period. Thus, the user will be given the opportunity to reconfigure the quality model in an attempt to improve performance. This process continues until either the user quits or the business becomes bankrupt. In this way, the user is afforded the opportunity to implement and tune a quality system while receiving realistic feedback period after period.

Detailed Description of the Models

With reference to FIGS. 3–10, the models will now be explained in more detail. These figures show flow charts representing the process of each model as well as the interaction between the models. In the depicted embodiment, the models are connected primarily through the product flow. That is, the programming logic, data transmission, and model interaction generally follows the product flow. Such a scheme or orientation makes sense since product flow is the nature of the business. It should be understood, however, that other orientations are possible; for example, the models could be interconnected based on cash flow or human resources. Moreover, throughout this disclosure certain subroutines are presented in BASIC, and a working computer program of the invention is attached as Microfiche Appendix. Again, it should be understood that the procedural aspects of the subroutine could be implemented in any number of different computer languages, including, but not limited to 4 gl languages. Furthermore, other logically equivalent steps could be used to effect the same results.

Business Model

Figure 4:
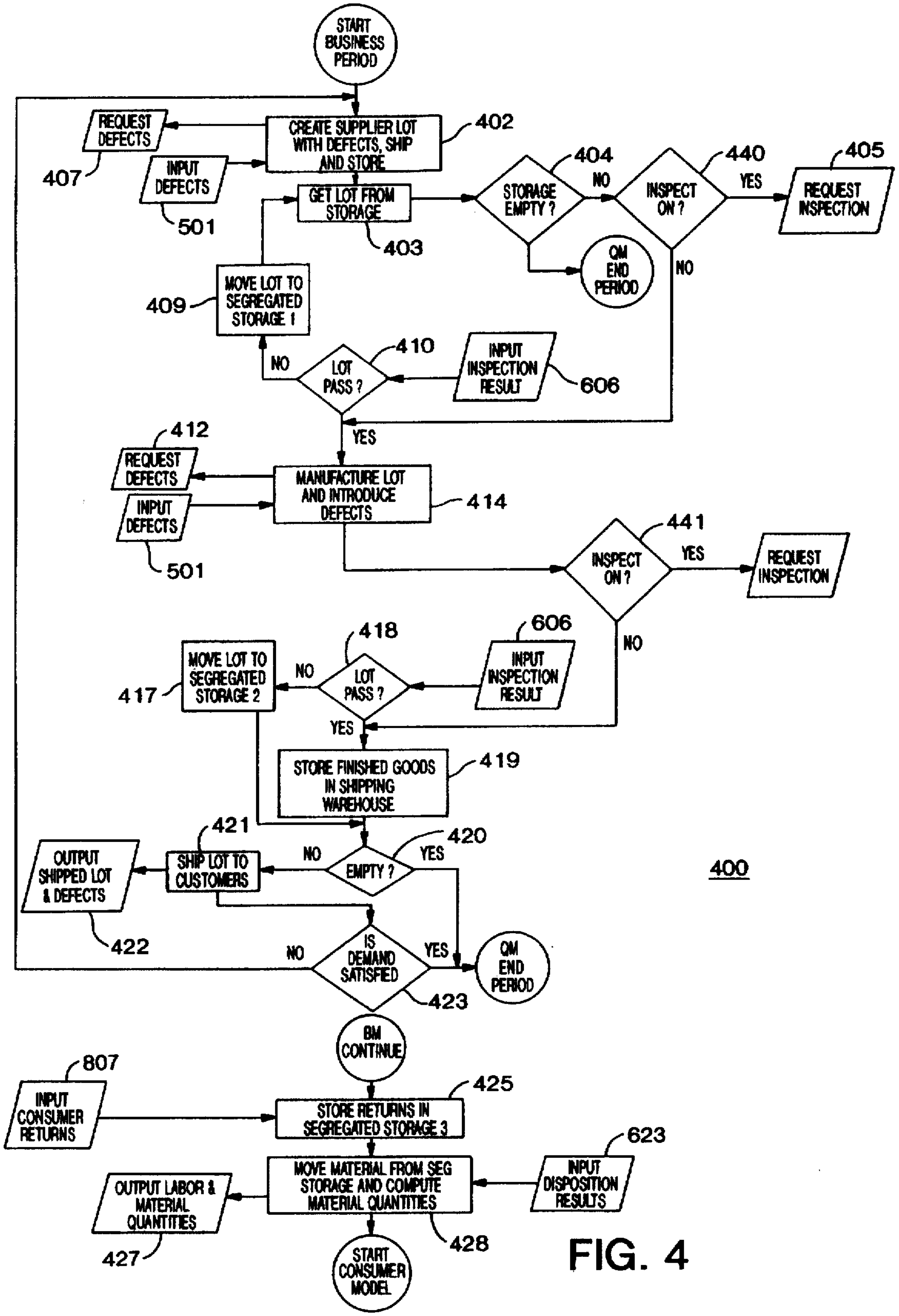
FIG. 4 shows a flow chart of the business model.

Since the simulator in this embodiment is oriented around the product flow, a description of the business model 400 as shown in FIG. 4 provides a logical starting point. In sum, anticipated sales demand sets the production schedule for a time period. Raw materials are purchased from suppliers. This material is stored, inspected, processed and the final Product inspected before being shipped to consumers. Consumers use the product, and a portion of them discover defects. Of this portion, some return the defective Product to the business, and some become dissatisfied and migrate to competitors. Contravening the tendency to migrate, advertising by the business causes a proportion of the market to purchase the Product rather than buy a competitive one. This outflow and inflow of consumers, together with an overall market growth trend creates demand for the next time period.

Considering the product flow in greater detail, after a period starts, Block 402 creates, ships and stores a supplier lot which contains a number of defects. The lots are stored in a warehouse, the capacity of which is a user set parameter. The defects are generated by the business model 400 outputting a defect request in Block 407 to the defect generator 500 (described below). The defect generator 500 responds by outputting a number of defects in Block 501 which are then introduced to the supplier lot.

Next, the business model 400 retrieves a supplier lot from storage in Block 403, and determines whether the storage is empty in Block 404. If so, then the period ends. If the storage is not empty, Block 440 determines whether the user has installed an incoming inspection quality assurance measure. If not, the process advances to Block 414 (described below). If the user did install the incoming inspection, the business model requests an inspection in Block 405. The business model receives results of the inspection in Block 606 from the quality model 600 (described below). Block 410 determines whether the lot was passed by the quality model. When nonconforming lots are detected by the quality model, the lots are removed/diverted from the main product flow and the business model must make up the loss to meet consumer demand. If the lot failed inspection, the lot is moved to segregated storage 1 in Block 409, and the model returns to Block 403. If the lot was passed, it enters the manufacturing process in Block 414 to form a manufactured lot, and again defects are introduced.

As before, defects are introduced by the business model 400 outputting a defect request in Block 412 to the defect generator 500. The defect generator 500 responds, and outputs defects in Block 501 which are integrated into the manufactured lot. It should be noted that the defects may be introduced in the manufactured lot at the same time defects are introduced in the supplier lot. That is, since the incoming and final inspections are "looking" for different types of defects, all the defects could be initially inserted without causing an inordinately high fail rate at the incoming inspection. Such an approach may be preferred from a programming efficiency viewpoint.

Block 441 determines whether the user has installed a final inspection quality assurance measure, and if not, the process advances to Block 419 (described below). If, however, the final inspection is installed, Block 415 requests an inspection of the manufactured lot from the quality model 600. The business model receives the results of the inspection in Block 606 from the quality model, and Block 418 determines whether the lot was passed. If not, it is moved to segregated storage 2 in Block 417, and the model advances to Block 420 (described below). This particular embodiment, moves the nonconforming material to storage, where it may be dispositioned of as scrap, stored, repaired/reworked, or used "as is". If the lot passes, Block 419 stores the lot as finished goods for shipping.

Block 420 determines whether the shipping warehouse is empty. If it is, then the period ends. If it is not, the lot ships to customers in Block 421, and Block 422 outputs this information to the consumer model 800 (described below). Next, Block 423 determines whether the market demand has been satisfied. If not, the model returns to Block 402 to reiterate the process. If the demand is satisfied, the period ends.

At the end of a period, the business model receives information regarding consumer returns from Block 807 of the consumer model. The returns are stored in segregated storage 3 in Block 425. Once the business model 400 receives disposition results from Block 623 of the quality model 600, Block 428 moves material from segregated storages 1, 2, and 3, and computes the labor and material requirements of the disposition. This information is outputted to the accounting model 700 (described below) in Block 427.

The business model is designed to run independent of the other models. That is, the data and parameters of the business model such as product type and flow can be modified in the business model without adjusting the other models. This enables the user to customize the system 100 to a specific business quickly and easily.

Defect Generator

Figure 3:
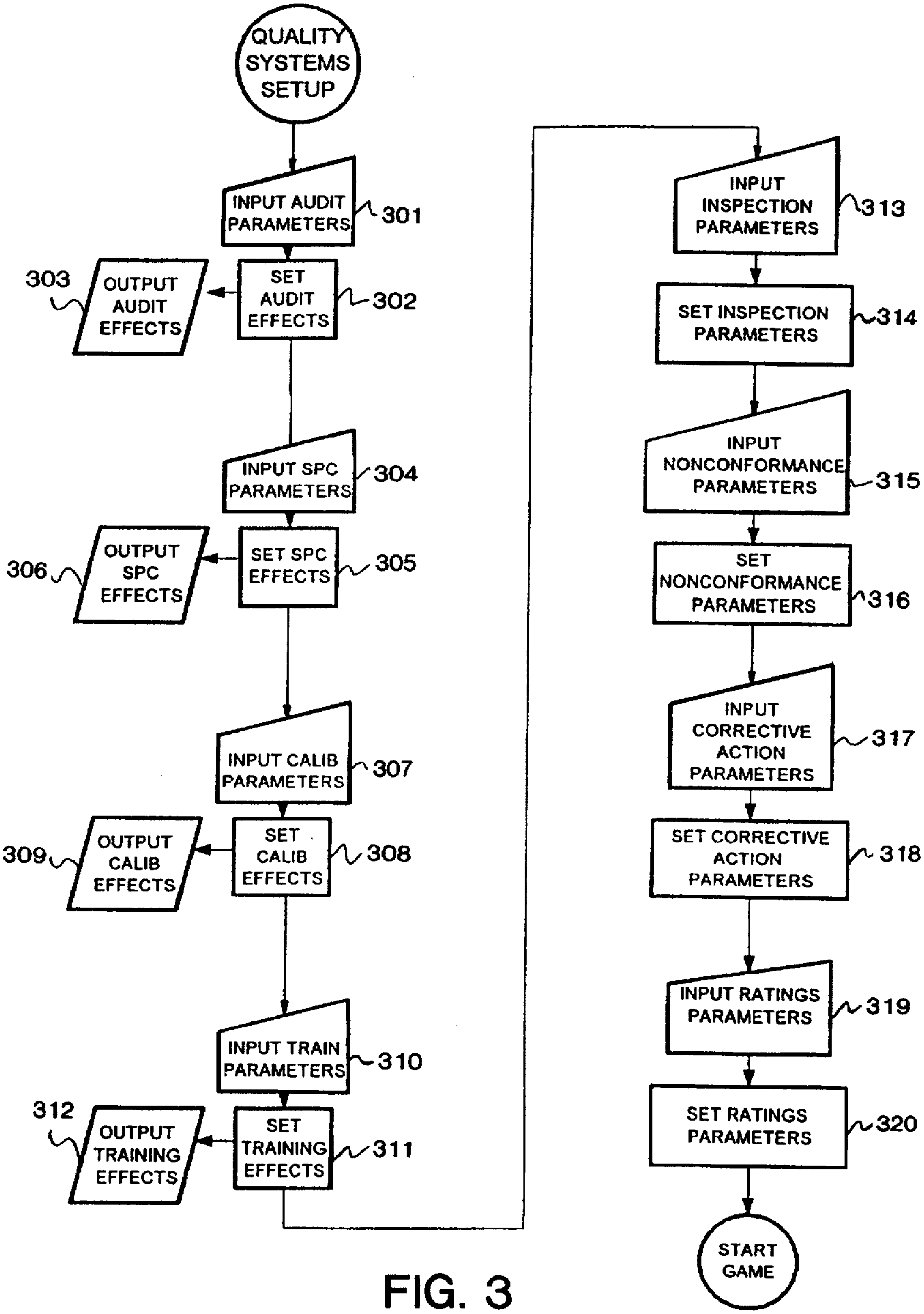
FIG. 3 shows a flow chart of the configuration of the quality model.
Figure 5:
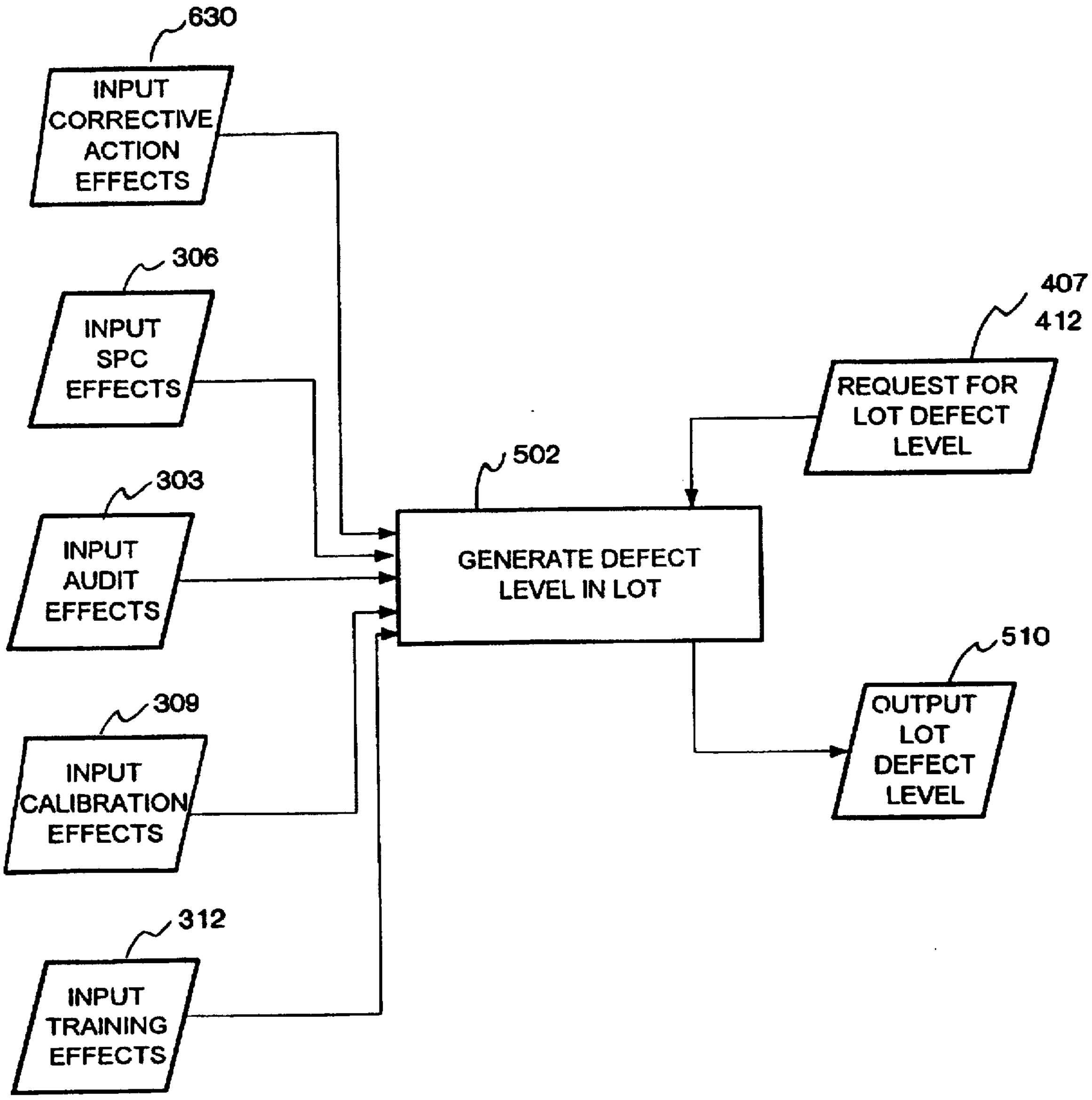
FIG. 5 shows a flow chart of the defect generator.
Figure 6:
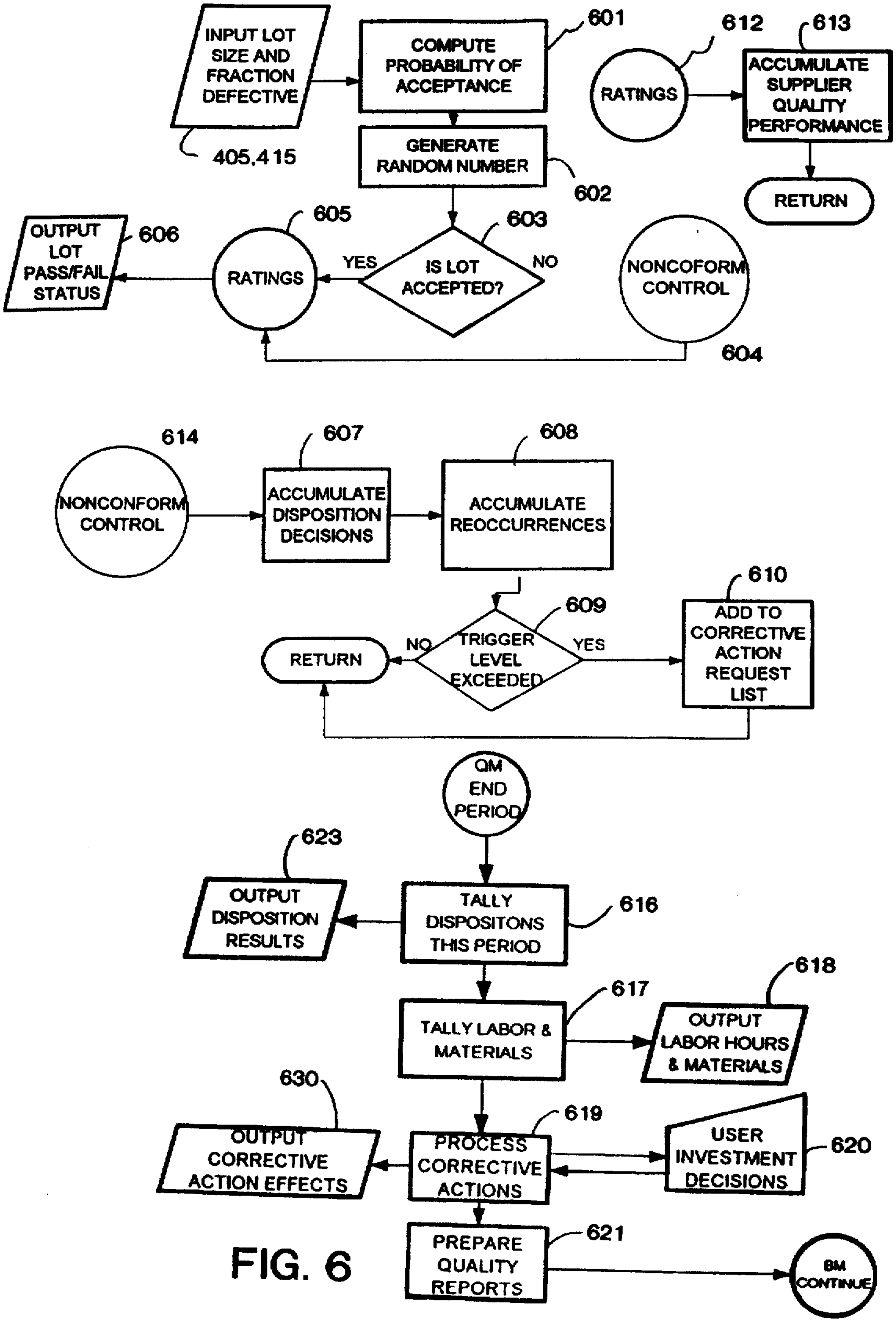
FIG. 6 shows a flow chart of the quality model.

Defects are introduced into the product flow by a Defect Generator at different stages in a realistic fashion. A flow diagram of the defect generator is shown in FIG. 5. The defect generator 500 receives a request for defects from Block 407 (supplier lot defects) or 412 (processing defects) of the business model. Block 502 then generates a number of defects, and outputs this information in Block 501. In the preferred embodiment, the defect generator and the quality model have substantial interaction. For example, the implementation of preventive measures reduces the occurrence of certain defect exponentially over time, while investment in corrective actions actually halts certain defects immediately. FIG. 3 shows the dependency of Block 502 on Blocks 306, 303, 309, and 312 which represent the effects of the SPC, audit, calibration, and training preventive measures respectively. The defect generator also receives the effects of the corrective action from Block 630 of the quality model (FIG. 6). These effects in turn influence the number of defects generated in Block 502.

Although there are many possible configurations for the defect generator, the preferred embodiment not only introduces defects, but also relates the defect to a specific characteristic. This provides for more realistic modelling. The present embodiment uses a Monte Carlo selection technique for determining first the supplier of the lot, and second the number and type of defects present in the lot. For example, Block 502 would be initiated with cp parameters relating to the probability of particular characteristic defects in the lots of particular suppliers. The following BASIC code illustrates how the cp probabilities are initiated in the present embodiment. It is anticipated that the cp parameters will be initialized by the user according to his or her supplier history.

```
set probability of cause event occurring for each supplier,
   for characteristic 1
```

supplier 1 is the worst [18%] defective note: sum cp is then multiplied by avg defect level cp(1, 1, 1)=0.1 supplier 2 is next worst [9%] defective cp(2, 1, 1)=0.1 cp(2, 1, 16)=0.1 cp(2, 1, 17)=0.05

Thus, using these parameters and traditional Monte Carlo selection techniques, the generator introduces a quantity and type of defects into the product flow based upon a particular supplier.

Quality Model

The quality model emulates the impact of quality assurance measures on the product flow. To begin the simulation, the user must first configure the quality model by entering a selection of quality assurance measures. Each quality assurance measure corresponds to a mathematical relationship within the quality model. In the preferred embodiment, the quality model contains a multitude of such relationships representing various quality assurance measures, although it may contain just one. The user's selection may range from none of the measures to all of them. When the user selects or installs a quality assurance measure, its corresponding mathematical relationship is enabled. Thus, the configured quality model comprises a selection of enabled mathematical relationships.

A flow diagram of the configuration process is shown in FIG. 3. The user may input preventative quality assurance measures such as audit, statistical process control (SPC), calibration and training in Blocks 301, 304, 307, and 310 respectively. Blocks 302, 305, 308, and 311 then configure the quality model accordingly. The effects of the audit, SPC, calibration and training are outputted to the defect generator in Blocks 303, 306, 309, and 312 respectively. In addition to these preventive quality assurance measures, the user may input other quality assurance measures such as inspection (incoming and final), nonconformance control, corrective action control, and supplier control (i.e., rating) in Blocks 313, 315, 317, and 319 respectively. The quality model is then configured accordingly by Blocks 314, 316, 318, and 320 to complete the configuration process.

The configured quality model then interacts with the product flow to simulate the effects of the quality assurance measures. Considering first the preventive quality assurance measures, these are aimed at quality problems that require continuous monitoring to maintain control as opposed to a "permanent" fix such as replacing bearings. These quality problems behave in a manner that exponentially increases the likelihood of a defect occurrence unless the appropriate preventive quality assurance measure is in place, in which case the likelihood decreases. In this particular embodiment four preventative quality assurance measures are available:

Statistical Process Control (SPC) spots adverse trends in the manufacturing process and allows for correction before defects occur;

Calibration spots/prevents adverse trends in the accuracy and precision of testing equipment before errors can lead to mistaken testing results;

Personnel training spots/prevents adverse trends in the performance of people before this behavior can lead to the creation of defects; and Auditing spots/prevents (through recommendations) deviations of behavior from prescribed quality procedures before the behavior leads to the creation of defects.

It should be understood, however, that other preventative quality assurance measures exist and may be implemented in the quality model. The following BASIC code illustrates how preventive actions (Calibration, SPC, Training, etc.) are implemented in the simulator. With the preventive subsystem off, the probability of a defect increases (e.g. cf>1) each cycle. With the preventive subsystem on, the probability of a defect decreases (e.g. cf<1) each cycle.

```
Sub calibration ()
'This routine scans potential calibration problems
'(cp(i,j,calibcause) [cause between 6 and 10] and modifies likelihood by
'calibration factor (up cf>1; down cf<1 [calib subsystem on])
 For ksupplier = 1 To 3
  For kchar = 1 To nchar
   For kcause = 6 To 10
    cp(ksupplier, kchar, kcause) = calibrationfactor * cp(ksupplier, kchar,
    kcause)
   Next kcause
  Next kchar
 Next ksupplier
End Sub
```

Similar routines exits for SPC, Training and Auditing quality subsystems. Thus, the preventative quality assurance measures are simulated in the particular embodiment by reducing the number and types of defects created by the defect generator. This effect on the defect generator 500 is shown in FIG. 5, wherein the effects of the various preventative quality assurance measures are being inputted into Block 502 which generates the defect level in lot.

Other optional quality assurance measures include inspections and nonconformance control. When material arrives from suppliers it is inspected, conformance status is determined in this embodiment using standard statistical sampling procedures ASQC/ANSI Z1.9 & Z1.4, and suppliers are rated based upon the determined status. In this particular model, two inspections are available: incoming and final. The incoming inspection detects defects before manufacturing time and money is spent on them, while the final inspection is designed to prevent defects from reaching consumers and necessitating returns and diminishing customer satisfaction. A flow diagram of the inspection quality assurance measure is shown in FIG. 6 which is the same for the incoming and final inspections in this embodiment. In Block 405 (incoming) or 415 (final), the business model sends the quality model an inspection request and information regarding lot size and fraction of defects for each characteristic. Using this information and traditional probability formulas, B 601 calculates the probability of acceptance, and Block 602 generates a random number. Block 603 then determines whether the lot is accepted based on the probability of acceptance and the random number using a Monte Carlo selection technique. Once inspected and found to be either nonconforming or acceptable, the quality model provides for other optional quality assurance measures.

By selecting nonconformance quality assurance measures, the user enables the quality system to monitor characteristic defects and causes. As shown in FIG. 6, if the lot is accepted, Block 605 rates the supplier accordingly, and this information is accumulated as a measure of supplier quality performance in Block 613. It should be understood that "supplier" in this context entails the upstream source of product; it should not be construed as only a third party supplier to the business. If the lot is not accepted, it is assigned to the nonconformance control block 604. In reality, the quality system prescribes the use of a team of people, the Material Review Board (MRB), to determine the disposal of the nonconforming material. Block 607 performs this function, and accumulates the disposition decisions of the nonconformance lots. Reoccurrences of identical nonconformances (i.e., identical material code, characteristic, defect code, etc.) are accumulated in Block 608. By monitoring and tracking the types of defects and their origin, other quality assurance measures such as corrective actions may be implemented to stem the defect population.

A corrective action request in this embodiment is created by the optional nonconformance control quality assurance measure if reoccurrences of identical nonconformances exceed a user set maximum number, or if a supplier rating falls below a user established level. In FIG. 6, Block 609 determines whether the reoccurrences exceed a trigger level. If not, the process is returned back to Block 605, rating control, where the supplier's rating reflects the nonconforming lot. If the trigger level is exceeded, however, Block 610 adds to a corrective action request list, and the process returns to Block 605. After Block 613, the pass/fail status of the lot is outputted to the business model 400 in Block 606. A corrective action request may be prompted in a similar way for a poor supplier rating.

The corrective action quality assurance measure diagnoses a defect's cause, and recommends a remedial or corrective action. The user is prompted on whether to invest in this corrective action. Uninvested corrective actions remain in the recommendation backlog, while invested corrective actions are processed in an attempt to correct the underlying problem. Several key features of the corrective action warrant further elaboration.

The diagnosis and recommendation phases of corrective actions are simulated by relating diagnosis and recommendation to characteristic defect identity and code. When a defect occurs, there is a cause associated with it. This cause will depend on many factors, some of which can be modeled, others of which are too illusive. In the present embodiment, the cause depends on the source (i.e., the supplier or internal process) and the characteristic defect. It should be understood, however, that other dependencies may be modeled as well. This embodiment "tags" the cause to the defect at the time the defect is generated. That is, Block 502 of the defect generator is programmed not only to introduce a quantity and type of defects, but also to assign the defect a cause. Since characteristic defects and causes are specific to a particular business, a user may populate the User Defined Table of Defect Events (UDTDE) data base with such defect data. The cause probabilities for a particular characteristic defect for a particular supplier are entered into distribution tables cp(lotsupplier, kharselect, k1), dlevel (k2). Again, the generator uses a Monte Carlo selection technique to arrive at a single cause. The following BASIC code illustrates how defects are generated from the UDTDE data base having distribution tables cp(lotsupplier, kharselect, k1), dlevel (k2).

```
'For each characteristic [kharselect] of suppliers
  'Select random defect cause
  x = Rnd
  'for each cause
  t = 0#
  ihit = 0
  sden(lotsupplier) = sden(lotsupplier) + actualotsize
  For k1 = 1 To ncause
    t = t + cp(lotsupplier, kharselect, k1)
    If (x <= t) Then
      lotcause(kharselect) = k1
      'set hit
      ihit = 1
      'Select defect level for this lot
      x = Rnd
      t1 = 0#
      For k2 = 1 To ndlevel
        t1 = t1 + dlevel(k2)
        If (x <= t1) Then
          defectslot(kharselect) = defect(k2) * actualotsize
          'track supplier defect level
          snum(lotsupplier) = snum(lotsupplier) + defectslot(kharselect)
          Exit For
        End If
      Next k2
    End If
    If (ihit = 1) Then Exit For
  Next k1
```

Thus, the generator selects a cause contemporaneously when it creates the defect. It should be understood, however, that diagnosing a cause may be performed at a different time and in a different location. For example, the nonconformance control Block 614 in the quality model may be configured to perform this function.

The invested corrective action involves novel techniques to statistically represent less than perfect recommendations and less than perfect implementation of the recommendations. That is, the effectiveness of the corrective action is adjusted by a "chaos" factor. The chaos factor recognizes that diagnosis and correction are subject to limited information, speculation, guesses, and human error. The following BASIC code illustrates how corrective actions are implemented in a particular embodiment. A successful implementation reduces to zero the probability, cp(i1, i2, i3), that a defect will be generated in the future. An entry to the implementation stack, nimpcastack(j, k) is made when the user chooses to invest in the implementation.

```
Sub implementca ()
'this routine wipes out the probability value, cp(ksupplier, kchar, kcause) for a given
'supplier/characteristic/cause on the designated time period.
'In effect, if the corrective action taken has been successful and no defects will be gener-
ated
'from this time forward
'
j = 1
'for each item in implement list
Do While j <= nimpca
  'check applicable period
  If (nimpcastack(j, 5) <= nperiod) Then
    i2 = nimpcastack(j, 2)
    i3 = nimpcastack(j, 3)
    i1 = nimpcastack(j, 4)
```

-continued

```
      x = Rnd
'total chaos (=1) means corrective action will never be effective.
      If (x > chaos(i1)) Then cp(i1, i2, i3) = 0#
      'but for supplier rating ca
      If (i2 = 20) Then
         'and cause is remove supplier
         If (i3 = 99) Then
            cp(i1, i2, i3) = 0
         End If
      End If
      'remove this entry from impca stack
      If (nimpca <= 1) Then
         'this is last entry simply remove stack
         nimpca = 0
         Exit Do
      Else
         For k = j To nimpca - 1
            For l = 1 To 5
               nimpcastack(k, l) = nimpcastack(k + i, l)
            Next l
         Next k
         nimpca = nimpca - 1
      End If
   Else
      j = j + 1
   End If
Loop
'check stack here
End Sub
```

It is expected that the user will enter chaos parameters specific to his or her business during the initialization of the quality model. Thus, the effectiveness of the corrective actions can be modeled to closely parallel reality.

At the end of a period, a tally is made in Block 616 of the disposition of defective product within the period. This information is outputted to the business model 400 in Block Next, Block 617 tallies the labor and materials requirements, and Block 618 outputs this information to the accounting model 700. The user then inputs investment decisions in Block 620, as prompted by the corrective action requests, which are processed in Block 619 and implemented in a future period. Finally, Block 621 prepares quality report for the user. The quality report may contain information regarding defects, nonconformances, supplier ratings, and the like.

Accounting Model

Figure 7:
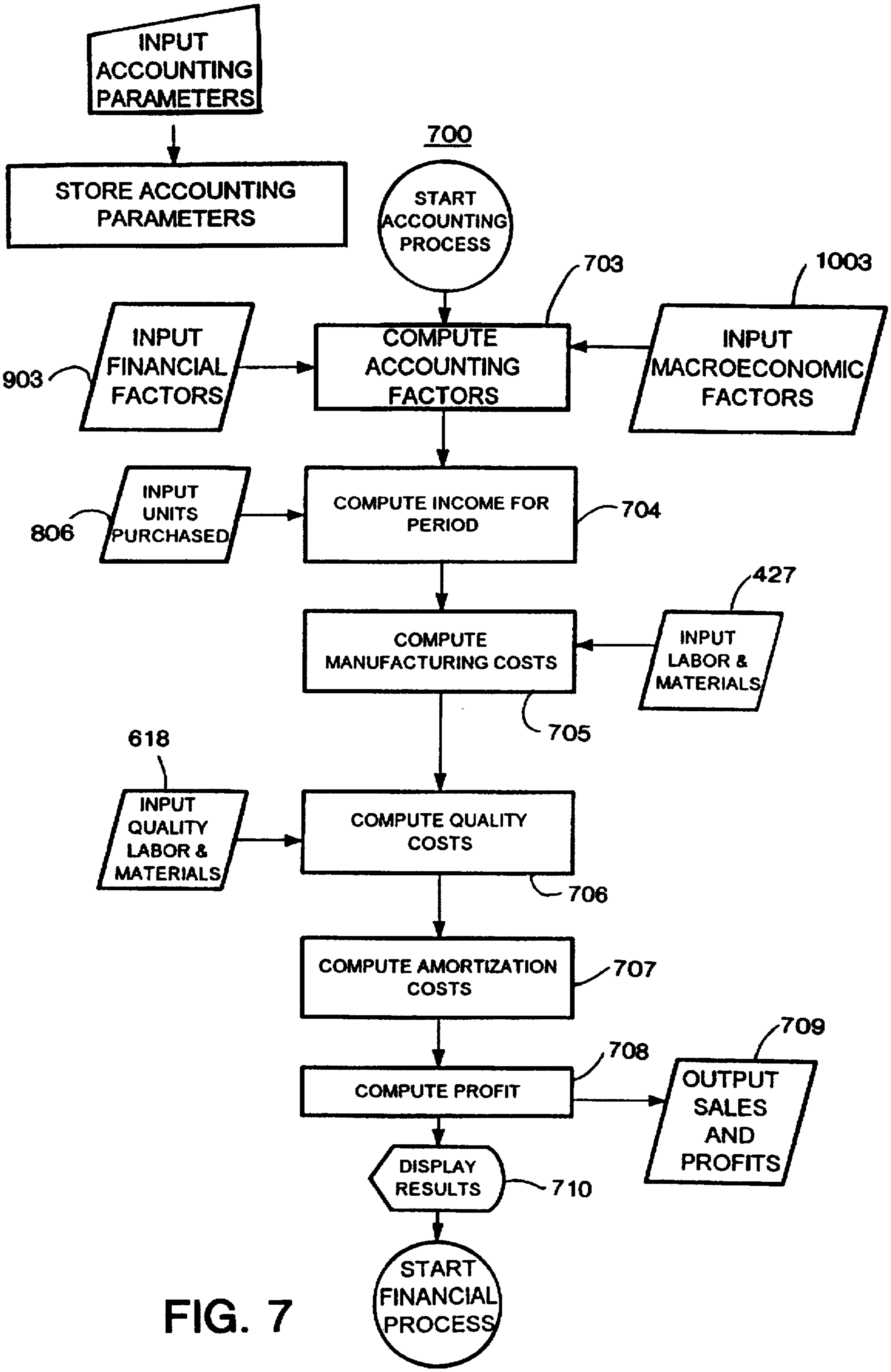
FIG. 7 shows a flow chart of the accounting model.

The present embodiment of the system contains an accounting model to provide the user with a "bottom line" indication of the quality system's impact. A flow diagram of the accounting model is shown in FIG. 7. Block 703 computes accounting factors based upon macroeconomic factors inputted from Block 1003 of the macroeconomic model and financial factors input from Block 903 of the financial model. Income for the period is computed in Block 704 based on units purchased input from block 806 of the consumer model. In Block 705, manufacturing costs are calculated based on the labor and materials requirements from Block 427 of the business model. These costs also include the scrap/repair/rework costs associated with dispositioning of nonconforming materials, and warranty costs associated with the return of defective product. Next, quality costs are determined in Block 706 based upon input from Block 618 of the quality model. Block 707 computes the amortization of the costs. Finally, Block 708 computes profit. Block 710 displays the information calculated in the accounting model, and Block 709 outputs the information to the financial model 900.

The cost of quality is among the information displayed by Block 710. Each quality subsystem has installation and operating requirements. These requirements are included as the cost of quality in the accounting model. Installation costs are capitalized and depreciated, while operating costs are expensed directly. Part of quality subsystem requirements are in the form of internal labor. In Block 706, labor hours are converted to dollars using a quality parameter of labor rate as initialized by the user. Operating costs are both fixed and variable. Fixed costs represent volume insensitive overhead for maintaining the subsystem (e.g., monthly reports), and are tabulated regardless of volume. Variable costs, on the other hand, are proportional to volume and are assessed accordingly. In this embodiment, except for training and calibration subsystems, the volume of transactions processed by a quality subsystem is determined by the volume of materials processed. For example, if 20,000 items have to be shipped in a given period, and it is discovered that only a portion (e.g. 80%) of the processed material is acceptable on final inspection, then the process volume is increased to meet demand (e.g. 25,000 units) subject to limitations such as plant capacity. With a known distribution of lot sizes, one can compute the number of lots to be inspected. Given a known number of characteristic defects and their past history, one can compute the number of tests required. Labor costs can be computed using the unit values (e.g. minutes/test). Again, the values are initialized by the user.

Consumer Model

Figure 8:
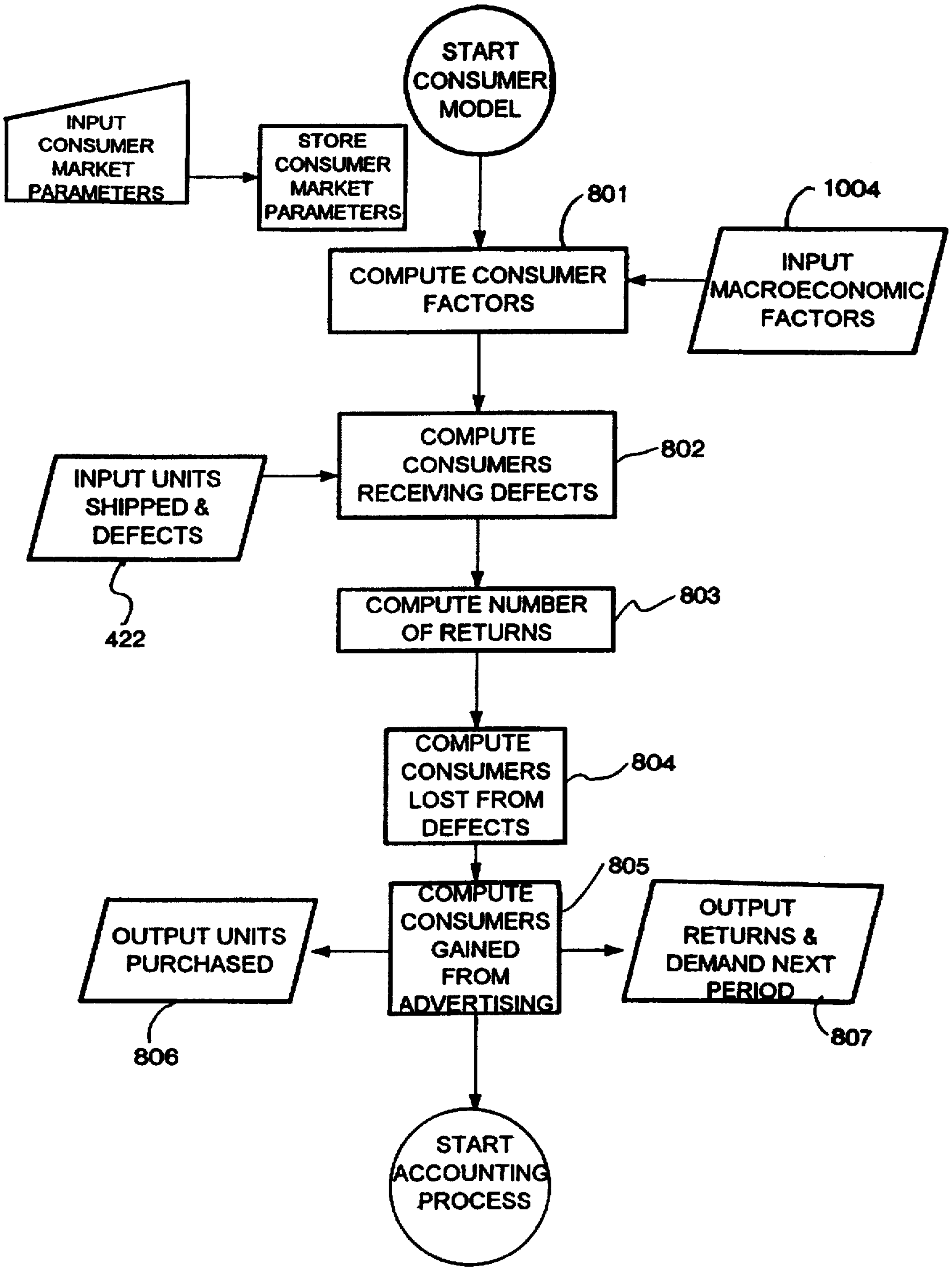
FIG. 8 shows a flow chart of the consumer model.

A flow diagram of the consumer model is shown in FIG. 8. There, Block 801 computes consumer factors based upon the macroeconomic factors input from Block 1004 of the macroeconomic model. Block 802 computes the number of consumers receiving defects based upon units and defects shipped from Block 422 of the business model. Of those who receive defective products, a proportion return the defective products and receive money back or product replacement. Block 803 calculates the number of returns based upon a mathematical relationship representing the tendency of people to return defective merchandise. Due to defects, a businesses reputation will suffer and a consumer may switch to a competing product. Block 804 computes the consumers lost from such defects using a mathematical relationship representing the tendency for people to switch between competing products. Finally, the amount of consumers gained from advertising is computed in Block 805. Block 807 outputs information on returned product and the demand for next period, while Block 806 outputs the units purchased. In one embodiment, Block 807 also takes into consideration the macroeconomic considerations from Block 801. The accounting process starts at this point. It is recognized that multiple companies can be modeled to compete with one another in a common market place. It is also recognized that price and other factors may be included as a determinator of customer movement.

Two important aspects of the consumer model are the portion of consumers who return defective product, and the migration of customers due to defects. These aspects are performed in Blocks 803 and 804 respectively. One embodiment of the programming of Block 804 is as follows:

Let:

NE(i) be the number of business consumers at the start of time period i

NE(i+1) be the number of business consumers at the start of time period i+1

NC(i) be the number of Competitors' consumers at the start of time period i

NC(i+1) be the number of Competitors' consumers at the start of time period i+1

GR(i) be the growth rate of the ith period

SDRE be the shipped defect rate this period for the business

SDRC be the shipped defect rate this period for the Competitors $\alpha$ be the effectiveness of advertising (probability of switching)

$\gamma$ be the likelihood of switching, having received a defect $\eta$ be the likelihood of returning defective a Product, having received it.

Then:

$NE(i+1)=(1+GR(i))NE(i)+QA1-QD1$ $NO(i+1)=(1+GR(i))NC(i)+QA2-QD2$

Where:

$QA1=\alpha A\$E*NC(i)$ $QA2=\alpha A\$C*NE(i)$ $QD1=\delta SDRE*NE(I)$ $QD2=\delta SDRC*NC(I)$ The return of defective products as handled in Block 803 may be programmed as follows:

$NDR(i+1)=\eta SDRE*NE(I)$.

Thus, the consumer model emulates consumer demand, reaction to defects, and switching tendency.

The Financial Market Model

Figure 9:
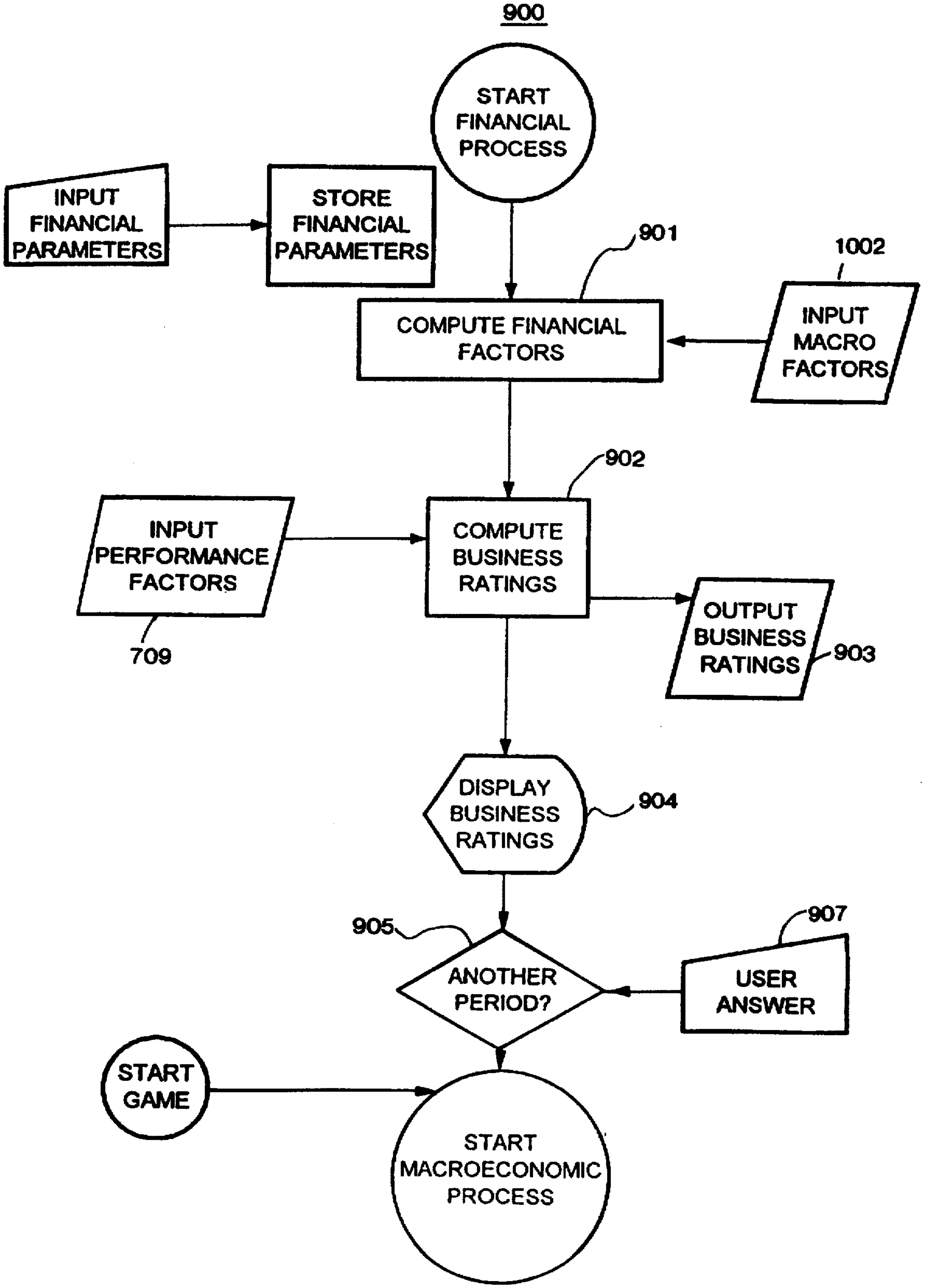
FIG. 9 shows a flow chart of the financial model.

Referring to FIG. 9, a flow diagram of the financial model is shown. Block 901 computes financial factors based upon macroeconomic input from Block 1002. In Block 902, business ratings are computed based upon performance factor input from Block 709 of the accounting model. This information is outputted by Block 903, and displayed by Block 904. Next, Block 905 determines if another period will be run. If the users responds affirmatively in Block 907, then the macroeconomic process is started. If the user responds negatively, the simulation ends.

An important aspect of this invention is the calculation of the company's worth or rating. This is done in Block 902, and in a preferred embodiment uses the profit, book value, and sales as inputted by Block 709 of the accounting model to calculate stock price. One possible programming approach to calculating stock price is by using the following formulae:

| | |
|---|---|
| stockprice=(bookvalue+2*annualsales)/stockshares | profit>0.0 |
| stockprice=(bookvalue)/stockshares | profit<=0.0 |
| where | |
| bookvalue=0.2*investedcapital + reservedollars | |

It should be understood that other valuation formulae are known and may be implemented as well. Thus, the user not only receives an accounting of the quality system's implementation, but also receives feedback on a broader scale regarding the companies worth. Company worth, it may be argued, represents the ultimate measure of a manager's performance.

Macroeconomic Model

Figure 10:
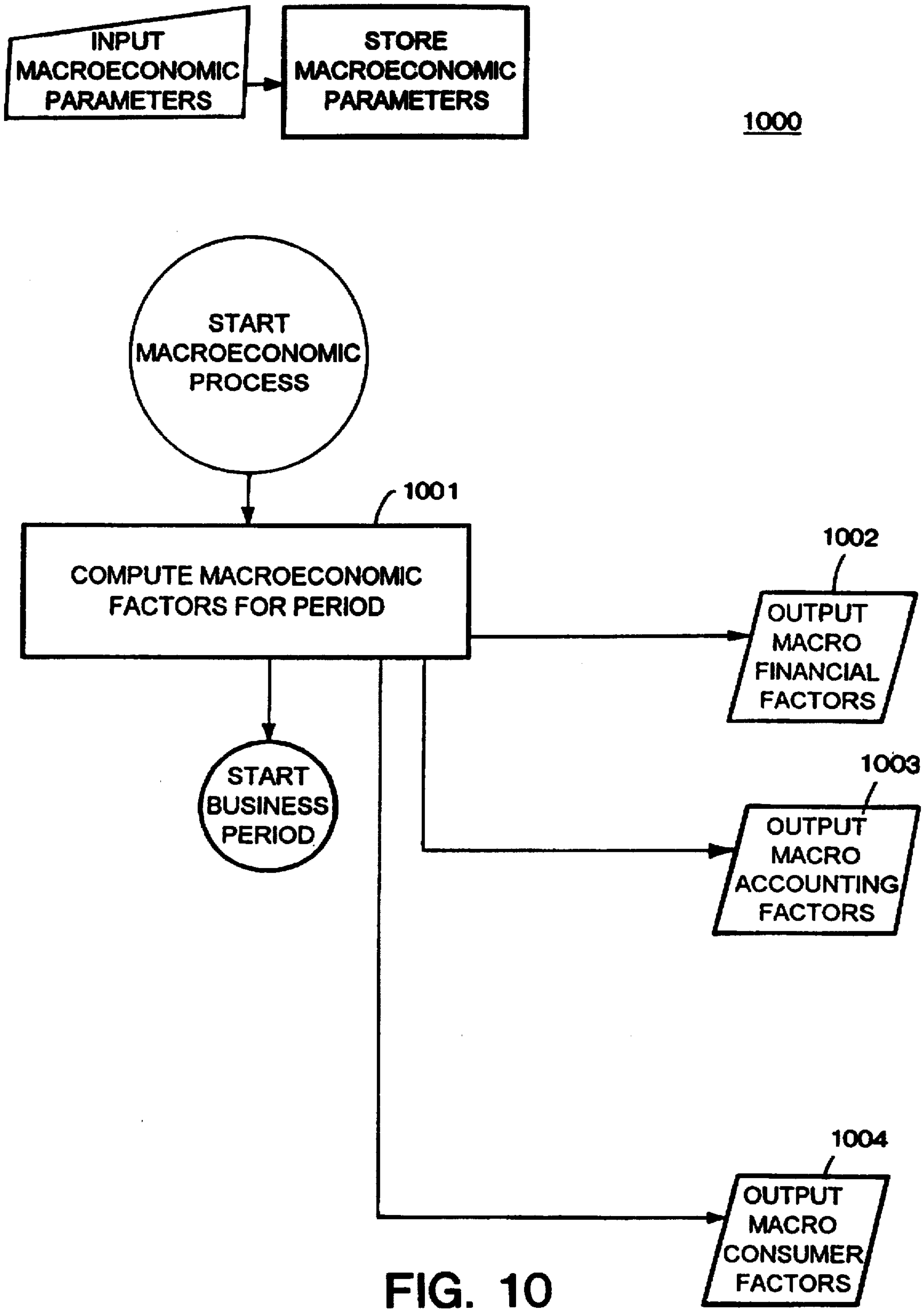
FIG. 10 shows a flow chart of the macroeconomic model.

FIG. 10 depicts a flow diagram of the macroeconomic model 1000. Block 1001 computes macroeconomic factors. This information is outputted as macroeconomic factors in Blocks 1002, 1003, and 1004 for the financial, accounting and consumer models respectively. Currently, the embodiment described in Appendix B does not contain a macroeconomic model, but one is anticipated. It is also recognized that the system 100 may be configured to interface with macroeconomic models already in existence.

Obviously, numerous modifications and variations of the present invention are possible in the light of the above teachings. It is therefore understood that within the scope of the appended claims, the invention may be practiced otherwise than as specifically described herein.

What is claimed is:

1. A process for simulating on a computer system the implementation of a quality system on a business having a product flow, said process comprising the steps of:

inputting a selection of quality assurance measures of said quality system;

configuring a quality model resident within said computer system according to said selection to form a configured quality model, said configured quality model having a mathematical representation of each quality assurance measure selected;

inputting product flow data representing said product flow with a number of defects;

applying said configured quality model to said product flow data; and displaying on a user interface of said computer system results of said quality assurance measures on said product flow as determined by applying said configured quality model.

2. The process of claim 1, wherein said number of defects depends upon said selection of said quality assurance measures.

3. A process for simulating on a computer system the implementation of a quality system on a business having a product flow, said process comprising the steps of:

inputting a selection of quality assurance measures of said quality system;

configuring a quality model resident within said computer system according to said selection to form a configured quality model, said configured quality model having a mathematical representation of each quality assurance measure selected;

generating product flow data from a business model resident within said computer system, said product flow data representing said product flow having a number of defects;

applying said configured quality model to said product flow data; and displaying on a user interface of said computer system results of said quality assurance measures on said product flow as determined by applying said configured quality model.

4. The process of claim 3, wherein said number of defects depends upon said selection of said quality assurance measures.

5. The process of claim 4, further comprising:

inputting and storing in memory of said computer system quality parameters used in said quality model; and inputting and storing in memory of said computer system business parameters used in said business model.

6. The process of claim 5, further comprising:

entering and storing defect data in a defect data base, said defect data representing characteristic defects and causes.

7. The process of claim 6, wherein said quality control measures are selected from the group consisting of inspection control, nonconformance control, preventative action control, and corrective action control.

8. The process of claim 4, wherein said number of defects depends on at least one quality assurance measures selected from the group consisting of preventive action control and corrective action control.

9. The process of claim 5 further comprising:

inputting and storing in memory of said computer system accounting parameters representing product price and costs of capital, labor, and material;

generating first requirements of capital, labor and material of said product flow from said business model;

generating second requirements of capital, labor and material of said selection of said quality assurance measures from said configured quality model;

applying an accounting model resident in said computer system to said product flow data and said first and second requirements, said accounting model using said accounting parameters and having a mathematical relationship representing income from said product flow and costs of said first and second requirements; and displaying on said user interface financial information as determined by applying said accounting model.

10. The process of claim 5, further comprising the steps of:

inputting and storing in memory of said computer system accounting parameters representing product price and costs of capital, labor, and material;

inputting and storing in memory of said computer system consumer parameters representing consumer tendencies to switch to a competitor and to return defective product;

generating first requirements of capital, labor and material for said product flow from said business model;

generating second requirements of capital, labor and material for said selection of said quality assurance measures from said configured quality model;

applying a consumer model resident in said computer system to said product flow data, said consumer model using said consumer parameters and having a mathematical relationship representing consumers returning a portion of said defective product and switching to competing products;

generating product purchased data as determined by applying said consumer model;

generating market demand and return data as determined by applying said consumer model;

applying said business model to said market demand and return data to adjust said product flow accordingly;

applying an accounting model resident in said computer system to said product purchased data and said first and second requirements, said accounting model using said accounting parameters and having a mathematical relationship representing income from said product purchased and costs of said first and second requirements; and displaying on said user interface financial information as determined by applying said accounting model.

11. A computer system for simulating the implementation of a quality system on a business having a product flow, said computer system comprising:

means for receiving a selection of quality assurance measures of said quality system;

means for configuring a quality model resident within said computer system according to said selection to form a configured quality model, said configured quality model having a mathmatical representation of each quality assurance measure selected;

means for generating product flow data, said product flow data representing said product flow having a number of defects;

means for applying said configured quality model to said product flow data; and means for displaying on a user interface of said computer system results of said quality assurance measures on said product flow as determined by applying said configured quality model.

12. The computer system of claim 11, wherein said means for generating product flow generates said number of defects depending upon said selection of said quality assurance measures.

13. The computer system of claim 12, further comprising:

memory for receiving and storing quality and business parameters used in said quality and business models respectively.

14. The computer system of claim 13, further comprising:

a defect data base connected to said means for applying, said defect data representing characteristic defects and causes.

15. The computer system of claim 14, wherein said quality assurance measures are selected from the group consisting of inspection control, nonconformance control, preventative action control, and corrective action control.

16. A computer system for simulating the implementation of a quality system on a business having a product flow, said computer system comprising:

memory having adequate capacity to store quality and business models, and to receive a selection of quality assurance measures of said quality system;

a CPU connected to said memory having adequate capacity to generate product flow data from said business model, said product flow data representing said product flow with a number of defects, and to configure a quality model according to said selection of quality assurance measures to form a configured quality model having a mathmatical representation of each quality assurance measure selected, and to apply said configured quality model to said product flow data; and a user interface connected to said CPU being capable of displaying results of said quality assurance measures on said product flow as determined by applying said configured quality model.

17. The computer system of claim 16, wherein said CPU generates said number of defects depending upon said selection of said quality assurance measures.

18. The computer system of claim 17, wherein said memory also has capacity to receive and store quality and business parameters used in said quality and business models respectively.

19. The computer system of claim 18, further comprising:

a defect data base connected to said CPU, said defect data base containing defect data representing characteristic defects and causes.

20. The computer system of claim 19, wherein said quality assurance measures are selected from the group consisting of inspection control, nonconformance control, preventative action control, and corrective action control.

21. A computer readable medium containing a computer program for simulating on a computer system the implementation of a quality system on a business having a product flow, said computer program comprising:

a quality model having at least one mathematical relationship representing a quality assurance measure of said quality system;

instructional means for enabling said mathematical relationship if a user selects said quality assurance measure;

instructional means for receiving product flow data representing said product flow with a number of defects;

instructional means for applying enabled mathematical relationship to said product flow data; and instructional means for displaying on a user interface of said computer system results of said quality assurance measure on said product flow as determined by applying said enabled mathematical relationship.

22. The computer readable medium of claim 21, wherein said number of defects depends upon at least one quality assurance measure.

23. A computer readable medium containing a computer program for simulating on a computer system the implementation of a quality system on a business having a product flow, said computer program comprising:

a business model for generating product flow data representing said product flow having a number of defects;

a quality model having at least one mathematical relationship representing a quality assurance measure of said quality system;

instructional means for enabling said mathematical relationship if a user selects said quality assurance measure;

instructional means for applying said enabled mathematical relationship to said product flow data; and instructional means for displaying on a user interface of said computer system results of said quality assurance measure on said product flow as determined by applying said enabled mathematical relationship.

24. The computer readable medium of claim 23, wherein said number of defects depends on at least one quality assurance measure selected from the group consisting of preventive action control and corrective action control.

25. The computer readable medium of claim 24, further comprising:

instructional means for receiving and storing in memory of said computer system quality parameters used in said quality model; and instructional means for receiving and storing in memory of said computer system business parameters used in said business model.

26. The computer readable medium of claim 25, further comprising:

instructional means for receiving and entering defect data in to a defect data base, said defect data representing characteristic defects and causes.

27. The computer readable medium of claim 26, wherein said quality model contains mathematical relationships representing quality assurance measures selected from the group consisting of inspection control, nonconformance control, preventative action control, and corrective action control.

28. The computer readable medium of claim 26, further comprising:

instructional means for generating first requirements of capital, labor and material of said product flow from said business model;

instructional means for generating second requirements of capital, labor and material of said selection of said quality assurance measures from said configured quality model;

an accounting model having a mathematical relationship representing income from said product flow and costs of said first and second requirements;

instructional means for receiving and storing in memory of said computer system accounting parameters representing product price and costs of capital, labor, and material;

instructional means for applying said mathematical relationship of said accounting model to said product flow dam and said first and second requirements; and instructional means for displaying on said user interface financial information as determined by applying said accounting model.

29. The computer readable medium of claim 25, further comprising:

instructional means for generating first requirements of capital, labor and material of said product flow from said business model;

instructional means for generating second requirements of capital, labor and material of said selection of said quality assurance measures from said configured quality model;

a consumer model having mathematical relationships representing consumers returning a portion of said defective product and switching to competing products;

instructional means for receiving and storing in memory of said computer system consumer parameters representing consumer tendencies to switch to a competitor and to return defective product;

instructional means for applying said mathematical relationship of said consumer model to said product flow data to generate product purchased data and market demand and returns data;

means for applying said business model to said market demand and returns data to adjust said product flow accordingly;

an accounting model having a mathematical relationship representing income from said product flow and costs of said first and second requirements;

instructional means for receiving and storing in memory of said computer system accounting parameters representing product price and costs of capital, labor, and material;

instructional means for applying said mathematical relationship of said accounting model to said product purchased data and said first and second requirements; and instructional means for displaying on said user interface financial information as determined by applying said accounting model.

30. The computer readable medium of claim 23, wherein said number of defects depends upon at least one quality assurance measure.

* * * * *